United States Patent
Burmester et al.

(10) Patent No.: US 10,155,242 B2
(45) Date of Patent: Dec. 18, 2018

(54) METERING DEVICE FOR A FLUID

(71) Applicant: Nordson Corporation, Westflake, OH (US)

(72) Inventors: Thomas Burmester, Bleckede (DE); Helge Lippelt, Luneburg (DE)

(73) Assignee: Nordson Corporation, Westlake, OH (US)

(*) Notice: Subject to any disclaimer, the term of this patent is extended or adjusted under 35 U.S.C. 154(b) by 134 days.

(21) Appl. No.: 14/426,804

(22) PCT Filed: Sep. 16, 2013

(86) PCT No.: PCT/IB2013/058581
§ 371 (c)(1),
(2) Date: Mar. 9, 2015

(87) PCT Pub. No.: WO2014/045184
PCT Pub. Date: Mar. 27, 2014

(65) Prior Publication Data
US 2015/0190837 A1     Jul. 9, 2015

(30) Foreign Application Priority Data

Sep. 19, 2012   (DE) .......................... 10 2012 216 817

(51) Int. Cl.
*G01F 3/10*     (2006.01)
*B05C 11/10*    (2006.01)
(Continued)

(52) U.S. Cl.
CPC .......... *B05C 11/1002* (2013.01); *G01F 13/00* (2013.01); *G01F 15/006* (2013.01);
(Continued)

(58) Field of Classification Search
CPC ........ G01P 3/36; G01P 3/486; B05C 11/1002; B05C 5/0254; B05C 11/1042;
(Continued)

(56) References Cited

U.S. PATENT DOCUMENTS

| | | | |
|---|---|---|---|
| 3,021,710 A | 2/1962 | Marcel et al. | |
| 3,217,539 A * | 11/1965 | Owen | G01F 1/103 73/861.77 |

(Continued)

FOREIGN PATENT DOCUMENTS

| | | |
|---|---|---|
| CN | 101605698 A | 12/2009 |
| DE | 2502599 A1 | 7/1976 |

(Continued)

OTHER PUBLICATIONS

Espacenet Machine Translation of Description, DE2554466A1.*
(Continued)

*Primary Examiner* — Charles P Cheyney
(74) *Attorney, Agent, or Firm* — Baker & Hostetler LLP

(57) ABSTRACT

The invention relates to a metering device (5) for a fluid, in particular hot melt adhesive, adapted for use with a dispensing apparatus (1) for said fluid or a remote metering apparatus (16) for transporting said fluid, comprising a housing (28), said housing comprising a fluid inlet and one or more fluid outlets, a gear (34) which is rotatably supported in said housing (28) and inserted in a gear chamber (31) in the housing (28) such that a cavity for fluid transport is formed in between two adjacent teeth and said housing (28), one or more chamber inlets in fluid communication with said fluid inlet and said gear chamber (31) such that fluid may flow into said gear chamber (31).

11 Claims, 14 Drawing Sheets

(51) Int. Cl.
*G01P 3/486* (2006.01)
*G01F 13/00* (2006.01)
*G01F 15/00* (2006.01)
*G01P 3/36* (2006.01)
*B05C 5/02* (2006.01)

(52) U.S. Cl.
CPC ............ *G01P 3/36* (2013.01); *G01P 3/486* (2013.01); *B05C 5/0254* (2013.01)

(58) Field of Classification Search
CPC ............ B05C 11/1044; B05C 11/1013; B05C 11/1036; G01F 13/00; G01F 3/10; G01F 15/006
USPC ............ 222/40, 52, 1, 146.5, 63; 73/861.79, 73/861.77; 417/42
See application file for complete search history.

(56) References Cited

U.S. PATENT DOCUMENTS

| | | | | |
|---|---|---|---|---|
| 4,409,829 | A * | 10/1983 | Weber | G01F 3/10 324/174 |
| 4,428,243 | A | 1/1984 | Taylor | |
| 4,641,522 | A * | 2/1987 | Lopresti | G01F 3/10 73/261 |
| 4,746,791 | A | 5/1988 | Forkel | |
| 4,878,454 | A * | 11/1989 | Cann | B05B 5/16 118/629 |
| 4,885,943 | A * | 12/1989 | Tootell | G01F 1/075 702/100 |
| 4,887,469 | A | 12/1989 | Shoptaw | |
| 4,936,151 | A * | 6/1990 | Tokio | G01F 1/06 73/861.77 |
| 4,953,403 | A * | 9/1990 | Springer | G01F 3/10 73/198 |
| 5,184,519 | A * | 2/1993 | Ciarelli | G01F 3/10 73/261 |
| 5,244,367 | A * | 9/1993 | Aslin | B67D 7/02 418/104 |
| 5,275,205 | A * | 1/1994 | Bauer | F04C 14/06 137/596 |
| 5,337,615 | A | 8/1994 | Goss | |
| 5,388,466 | A * | 2/1995 | Teunissen | G01F 1/103 73/861.33 |
| 5,393,201 | A * | 2/1995 | Okutani | F04C 28/28 250/231.15 |
| 5,415,041 | A * | 5/1995 | Foran, Jr. | G01F 3/10 73/261 |
| 5,553,493 | A * | 9/1996 | Box | G01F 3/10 702/45 |
| 5,616,862 | A * | 4/1997 | Pucher | G01F 3/10 73/261 |
| 5,638,174 | A * | 6/1997 | Henderson | G01F 1/06 356/338 |
| 5,668,327 | A * | 9/1997 | Amemori | G01F 1/065 73/861.77 |
| 5,704,767 | A * | 1/1998 | Johnson | F04C 11/00 417/43 |
| 5,782,609 | A * | 7/1998 | Ikemoto | F04C 29/0085 417/199.2 |
| 6,296,463 | B1 * | 10/2001 | Allen | B05B 7/0807 118/315 |
| 6,315,161 | B1 * | 11/2001 | Bezaire | B29B 7/7678 222/1 |
| 6,650,167 | B1 * | 11/2003 | Benzer | H03K 19/0013 326/68 |
| 6,658,747 | B2 * | 12/2003 | Kuru | F15B 15/2838 33/1 PT |
| 6,746,712 | B2 | 6/2004 | Hoffmann et al. | |
| 6,759,969 | B2 * | 7/2004 | Lund | H04L 5/02 340/870.02 |
| 7,650,800 | B2 * | 1/2010 | Ertler | G01F 3/06 73/861.77 |
| 7,770,760 | B2 | 8/2010 | McGuffey et al. | |
| 7,851,775 | B2 * | 12/2010 | Hoyt | G01F 3/10 250/231.15 |
| 8,069,719 | B2 * | 12/2011 | Tokhtuev | G01F 3/10 73/261 |
| 8,166,828 | B2 * | 5/2012 | Skirda | G01F 3/10 73/861.08 |
| 8,551,562 | B2 | 10/2013 | McGuffey | |
| 8,590,362 | B2 * | 11/2013 | Carbone, II | G01F 3/10 73/1.36 |
| 2003/0194481 | A1 | 10/2003 | Lippelt | |
| 2005/0133971 | A1 | 6/2005 | Haynes et al. | |
| 2011/0014369 | A1 | 1/2011 | McGuffey | |
| 2012/0031195 | A1 | 2/2012 | Skirda et al. | |

FOREIGN PATENT DOCUMENTS

| | | | |
|---|---|---|---|
| DE | 2554466 A1 * | 6/1977 | ............ G01F 3/10 |
| DE | 19516236 A1 | 11/1996 | |
| DE | 29618528 U1 | 1/1997 | |
| DE | 29620763 U1 | 2/1997 | |
| DE | 102005058440 A1 | 6/2007 | |
| DE | 102006025474 A1 | 12/2007 | |
| EP | 0497195 A1 | 8/1992 | |
| EP | 0741279 A1 | 11/1996 | |
| EP | 0993873 | 4/2000 | |
| EP | 1337349 B1 | 8/2003 | |
| EP | 1795868 A2 | 6/2007 | |
| JP | S57146115 A | 9/1982 | |
| JP | 58-047130 A | 3/1983 | |
| JP | S58127125 U | 7/1983 | |
| JP | S58184514 A | 10/1983 | |
| JP | H0499031 U | 8/1992 | |
| JP | 1992102447 | 9/1992 | |
| JP | H055642 A | 1/1993 | |
| JP | H08219847 A | 8/1996 | |
| JP | H10142244 A | 5/1998 | |
| JP | 2000202348 A | 7/2000 | |
| JP | 2003344137 A | 12/2003 | |
| JP | 2013532837 A | 8/2013 | |

OTHER PUBLICATIONS

Chinese Application No. 201380048916.8: First Office Action and Search Report dated Aug. 26, 2016, 12 pages.
John Gabay, Motion Sensing via Rotary Shaft Encoders Assures Safety and Control, Article, Aug. 16, 2012, 4 pgs.
U.S. Patent and Trademark Office, International Search Report and Written Opinion in PCT/IB2013/058581, dated Mar. 21, 2014.
U.S. Patent and Trademark Office, Internatinoal Preliminary Report on Patentability in PCT/IB2013/058581, dated Sep. 18, 2014.
European Application No. EP 13 83 9203: Supplementary European Search Report dated Apr. 1, 2016.
Japanese Patent Application No. 2015-532552: Reasons for Refusal dated Jul. 4, 2017, 3 pages.

* cited by examiner

METERING DEVICE FOR A FLUID

The present invention relates to a metering device for a fluid, in particular hot melt adhesive, adapted for use with a dispensing apparatus for said fluid or a remote metering apparatus for transporting said fluid, comprising a housing, said housing having a fluid inlet and one or more fluid outlets,
- a gear, said gear being rotatably supported in said housing and inserted in a gear chamber inside the housing such that a cavity for fluid transport is formed in between two adjacent teeth and said housing,
- one or more chamber inlets in fluid communication with said fluid inlet and said gear chamber such that fluid may enter the gear chamber, and
- one or more chamber outlets in fluid communication with said one or more fluid outlets and said gear chamber such that fluid is transported inside said cavities between said gear and a wall of said gear chamber towards the one or more chamber outlets and may flow towards the one or more fluid outlets.

The present invention also relates to an apparatus for dispensing a fluid, according to the preamble of claim 9, and to a remote metering apparatus according to the preamble of claim 10.

A metering device of the kind initially specified is used to dispense a precise volumetric flow of a fluid, in particular hot melt adhesive, separately via one or more fluid outlets. To that end, the metering device comprises a housing, said housing having a gear chamber in which a rotatably mounted gear driven by a fluid stream supplied to the metering device is located. In order to precisely control the volumetric flow of the supplied fluid, the current rotational speed of the gear is continuously monitored by a rotary encoder. The rotational speed of the gear is detected via an additional movable component, such as a shaft, by the rotary encoder disposed on the housing, and the signal generated by the rotary encoder is analyzed in order to determine the current rotational speed. In order to ensure that the metering device and the rotary encoder function reliably, an additional bearing and more particularly a seal for sealing the movable component against the gear chamber and the housing of the metering device are needed.

The object of the present invention is to provide a metering device and an apparatus for dispensing a fluid and a remote metering apparatus which are distinguished by a reduction in the number of components, in particular moving components, that are needed to monitor the rotational speed.

The invention achieves this object, in a metering device of the kind initially specified, with a measuring unit for contactless optical detection of the rotational speed of the gear.

The invention also achieves its object in an apparatus for dispensing a fluid and having the features of claim 9, and in a remote metering apparatus having the features of claim 10.

Contactless optical detection of the rotational speed of the gear, in accordance with the invention, simplifies sealing of the measuring unit against the housing, since there are no rotating components which need to be sealed against the latter. Furthermore, the rotary encoder as a component which needs to be mounted additionally on the housing is omitted, thus leading to a reduction in costs. Another advantage of the metering device according to the invention is that the optical measuring unit has high temperature and pressure stability compared to contactless, non-optical measuring units known from the prior art, so influences due to high ambient or media temperatures or to variations in pressure are negligibly small. The contactless optical measuring unit also has the advantage that it takes up little space, making it significantly more compact than, for example, the measuring units with rotary encoders initially described. Yet another advantage of the invention is that the measuring unit is designed to be used together with gears, the smallest module of which is less than 2 mm, preferably in a range between 1.5 mm and 0.5 mm, and particularly preferably in a range between 1.0 and 0.5 mm. The device preferably comprises one or more probes which are received, preferably light-sealingly and fluid-sealingly, within a correspondingly formed recess formed in the housing and which are adapted to emit light onto a portion of the gear, said recess being spaced apart from the rotational axis of the gear. It is considered an advantage that when using more than one probe per gear, for example two or three probes per gear, the multiplication of the measurement results allows higher resolutions. This is achieved, more particularly, by an arrangement of the probes along the gear, which leads to light signals being generated with a time offset, i.e., with a phase shift. This results in a higher sampling frequency and thus in a higher resolution.

The portion of the gear is preferably located in between the tip diameter and the root diameter of said gear. Due to this spatial limitation of the detection portion, the probe detects that portion of the gear which is directly used to transport the fluid.

In a preferred embodiment of the invention, it is proposed that the measuring unit comprises a light source for producing light and one or more fiber optics for guiding the light from the light source towards the probe. An infrared light source, such as an IR diode, is preferably used as the light source. Alternatively, light sources for emitting visible or ultraviolet light may also be used. Power consumptions in the order of less than one watt are sufficient to generate an adequate light intensity for measurement.

According to one preferred embodiment, the probe is adapted to receive light emitted by the light source.

The probe is preferably adapted to receive light reflected off the portion of the gear onto which the probe emits light. In that case, the probe detects a positive light signal whenever the optical path extending from the light source is reflected by the gear towards the probe. In one configuration, the fiber optics for the section connected to the light source and the fiber optics for the section connected to the (light) signal input are provided in a single fiber optics bundle and are therefore substantially coaxially aligned. In this case, a positive light signal is present whenever the gear affects the beam from the light source such that the optical path is reflected (back) to the probe.

According to an alternative embodiment of the invention, the light source is located on a side of the gear opposite to the probe, and adapted to emit light towards the probe such that the teeth of the gear at least partially block the optical path between said light source and said probe when passing through it. Unlike in the previously described embodiment, in this constellation it is not the light reflected by the gear into the measuring unit that is detected, but rather the light emitted directly from the light source. A positive light signal is accordingly present when the gear does not lie in the optical path. When the optical path between the light source and the probe is partially or entirely blocked, a weaker light signal or no light signal is present.

In one preferred embodiment of the invention, it is proposed that the measuring device comprises a signal transducer which is adapted to detect light received by the probe and to produce electrical signals corresponding to the intensity of the reflected light. The signal transducer produces electrical signals corresponding to the current rotational speed of the gear. These signals are supplied to a regulating device which then regulates the volumetric flow of the fluid supplied to the metering device. This regulating device is associated in the form of a processing unit with a PC, for example, or a glue dispenser or some other hardware connected to the metering device.

Advantageously, the signal transducer and the light source may be located outside the housing of the metering device. Due to the remote location of the signal transducer in particular, the effect of the heat radiated from a dispensing apparatus or remote metering apparatus on which the metering device is located, on the electronics of the signal transducer is reduced. This separation is also beneficial due to the limited amount of available space.

The measuring unit may have one or more fiber optics for guiding the light reflected into the probe from the probe to the signal transducer. In this embodiment, the emission of light onto the portion of the gears and the transfer of light radiated into the probe are guided via two separate fiber optics.

According to one preferred embodiment, the gear is a first gear and the metering device comprises one or more further gears which are respectively supported rotatably in the housing and enclosed in the gear chamber in the housing such that a cavity for fluid transport is formed in between two adjacent teeth and the housing, the teeth engaging each other such that a cavity for fluid transport is formed in between the engaging teeth. Increasing the number of gears allows the fluid stream to be distributed across a plurality of fluid outlets of the metering device.

More particularly, the one or more chamber inlets can be located such that fluid may pass between two adjacent gears in the direction of rotation of said adjacent gears.

Furthermore, an apparatus for dispensing a fluid, in particular hot-melt adhesive, is proposed, the apparatus comprising an applicator, said applicator comprising:
a base body comprising a fluid inlet, a fluid outlet and one or more fluid channels connecting said fluid inlet to said fluid outlet,
a nozzle for dispensing the fluid, the nozzle being coupled to the base body and in fluid communication with the fluid outlet,
one or more electrically or pneumatically actuated valves for selecting, releasing or blocking the fluid flow through the one or more fluid channels and/or through the nozzle, and
a metering device for the fluid, comprising one or more fluid inlets connectable to a heating device and one or more outlets in fluid communication with the fluid inlet of the apparatus,
the metering device being designed according to one of the preferred embodiments described in the hereinabove.

A remote metering apparatus for receiving and dispensing a fluid, in particular hot-melt adhesive, is also proposed, said remote metering apparatus comprising:
a base body comprising at least one fluid inlet as well as at least one fluid outlet, one or more fluid channels connecting said fluid outlet to said fluid inlet, at least one pump regulating the flow of said fluid,
a metering device for the fluid, said metering device comprising one or more fluid inlets connected to a heating unit and one or more outlets communicating with the fluid inlet of the remote metering apparatus,
the metering device being designed according to one of the preferred embodiments described in the foregoing.

The apparatus for dispensing a fluid according to the invention, and the remote metering apparatus for receiving and dispensing a fluid according to the invention are preferably developed with the features of one or more of the preferred embodiments of the metering device described hereinabove. Reference is therefore made to the above descriptions of said embodiments.

The present invention shall now be described in greater detail with reference to preferred embodiments and to the drawings in the Figures, in which.

Identical and functionally identical elements are given identical reference signs in the Figures. With regard to the reference signs used in the Figures, reference is made to the respective other Figures and to the associated description thereof.

Figure 1:
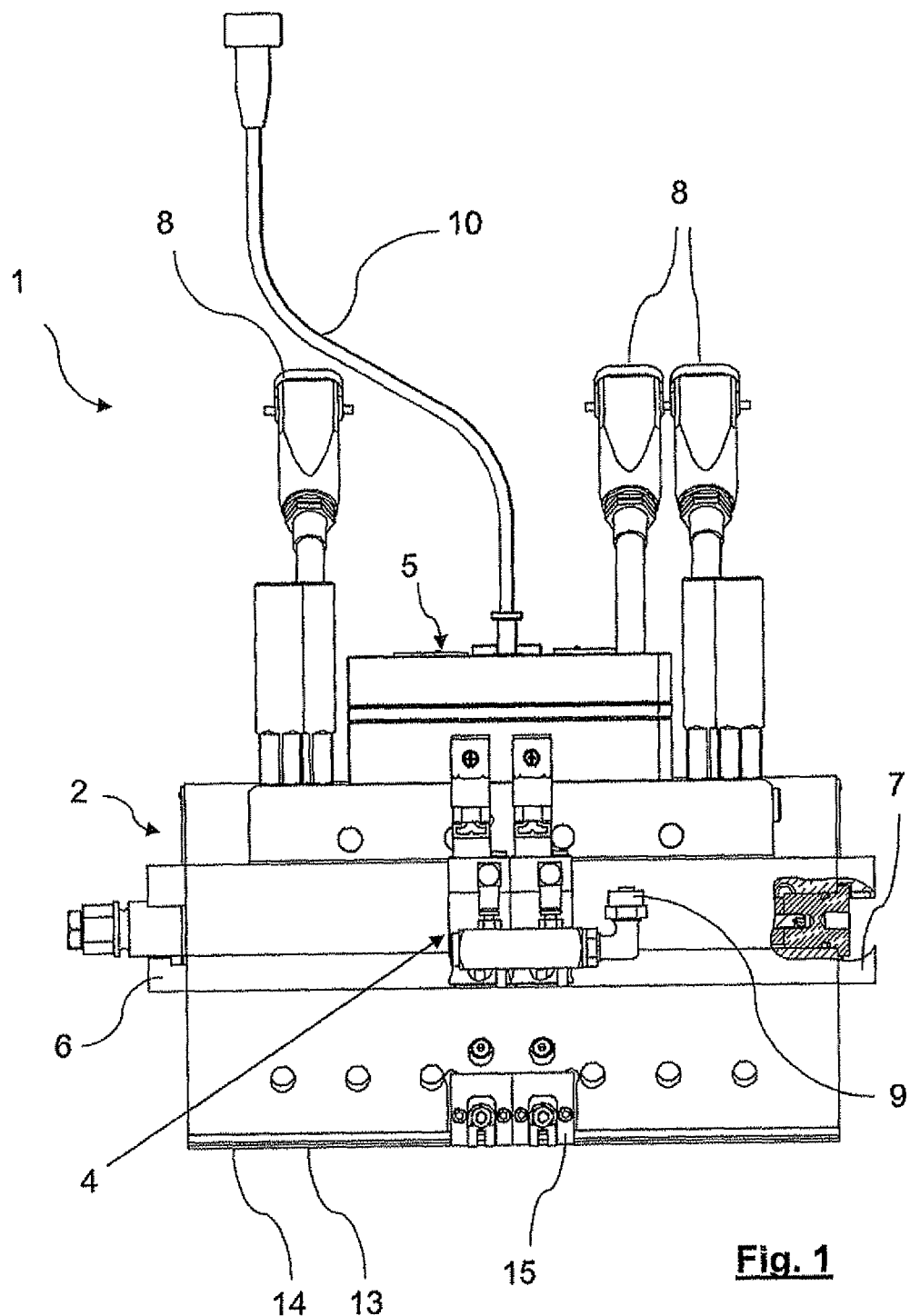
FIG. 1 shows a front view of a fluid dispensing apparatus.
Figure 2:
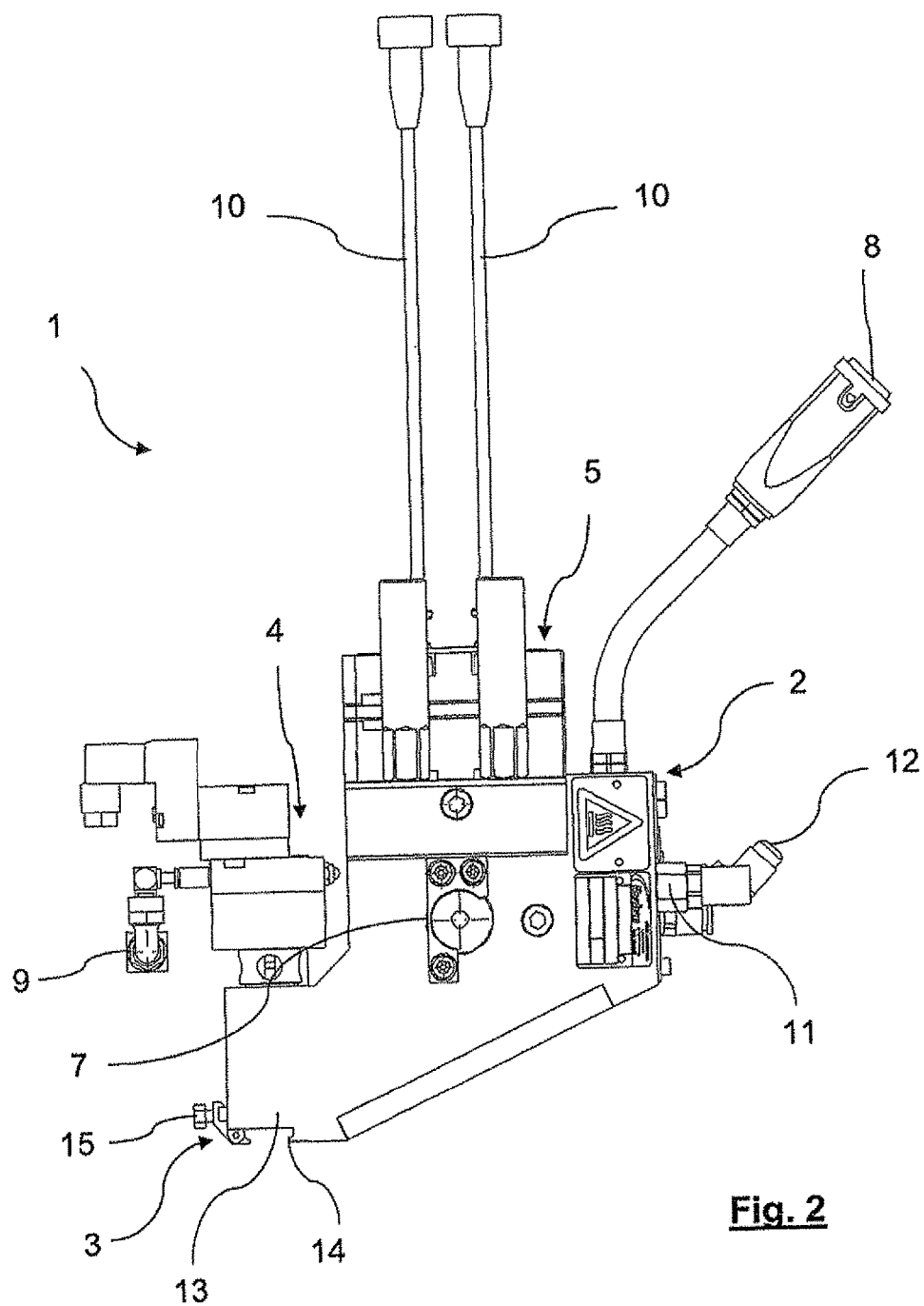
FIG. 2 shows a side view of the dispensing apparatus in FIG. 1.
Figure 3:
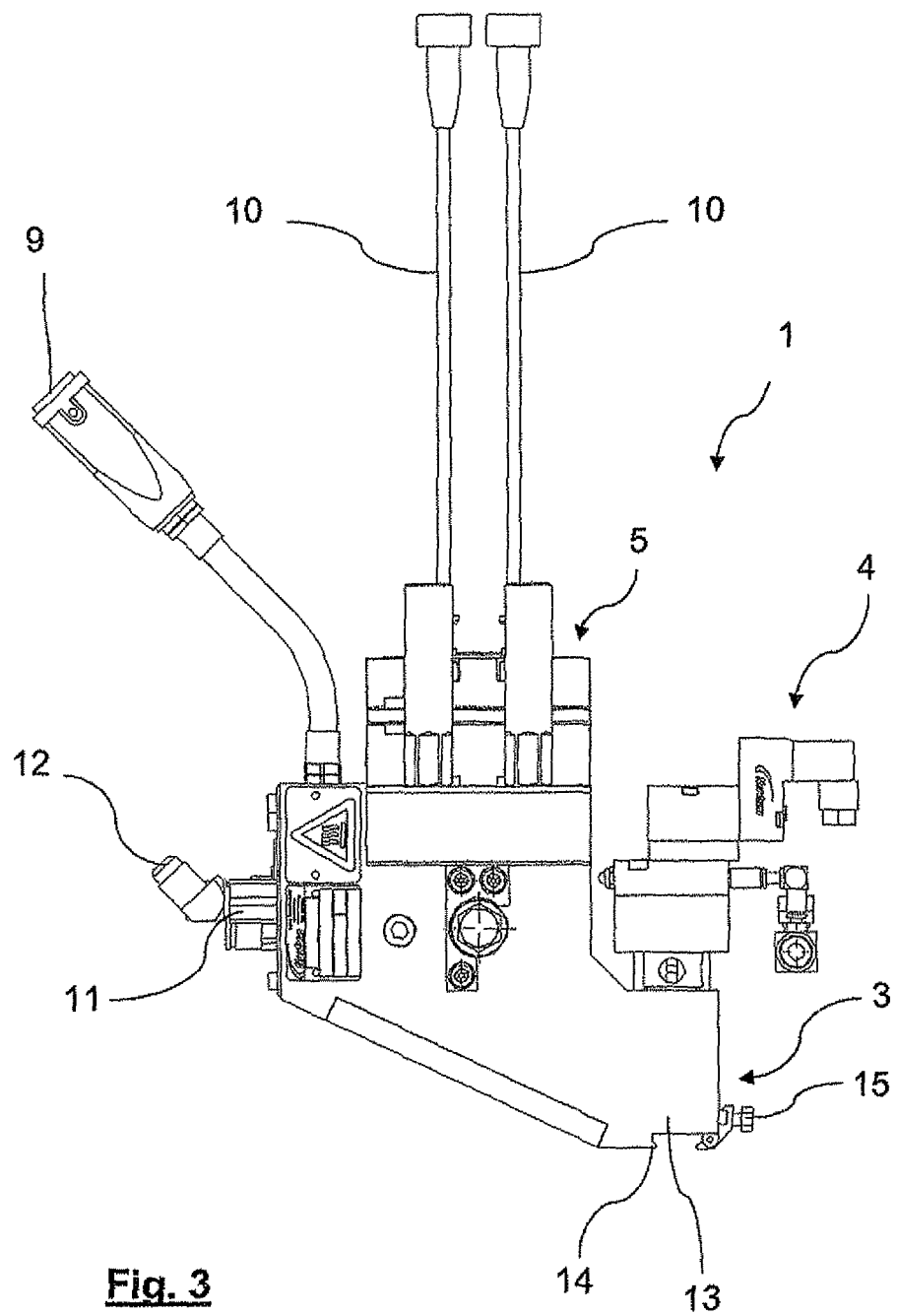
FIG. 3 shows a side view of the apparatus in FIG. 1.
Figure 4:
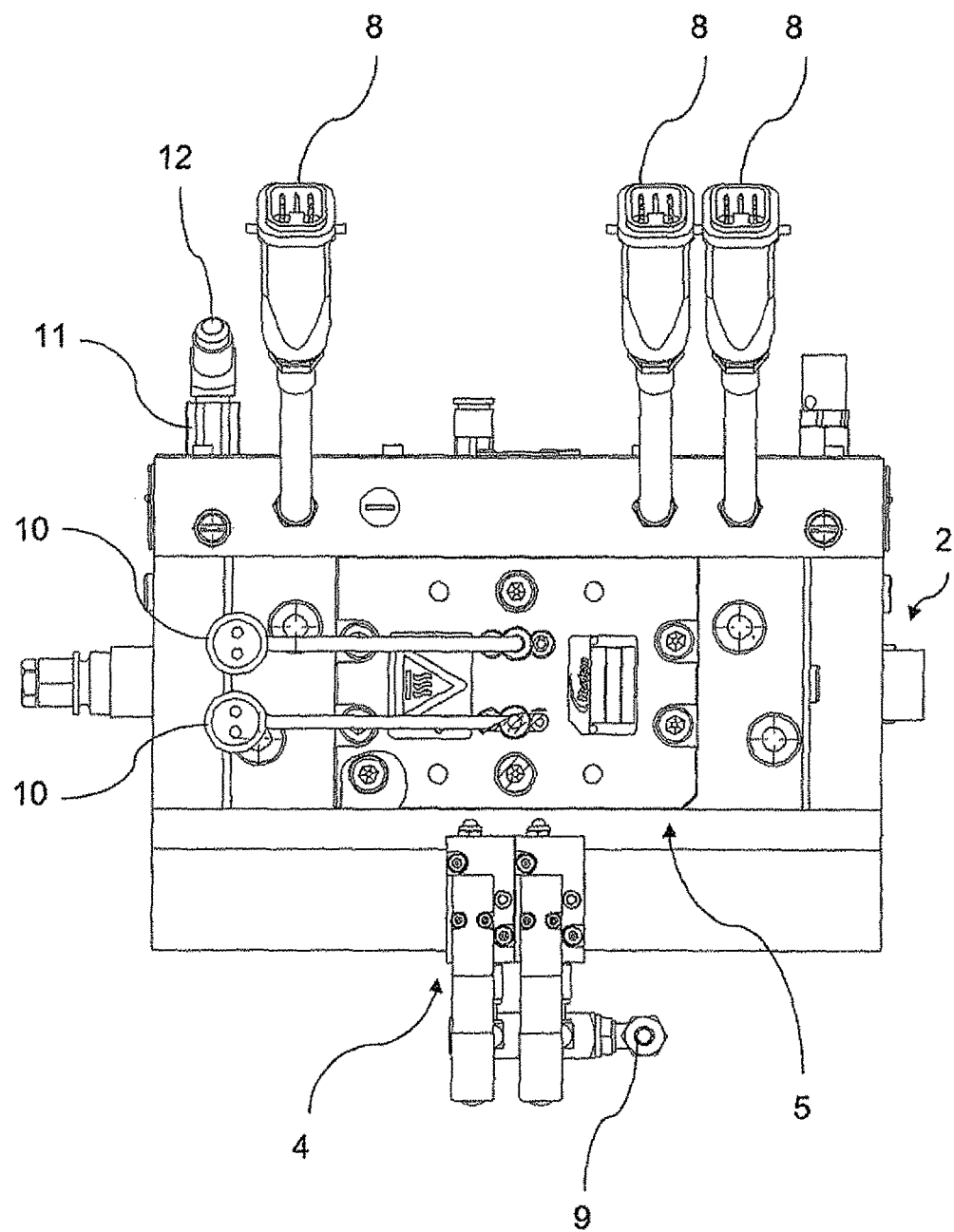
FIG. 4 shows a plan view of dispensing apparatus in FIG. 1.
Figure 5:
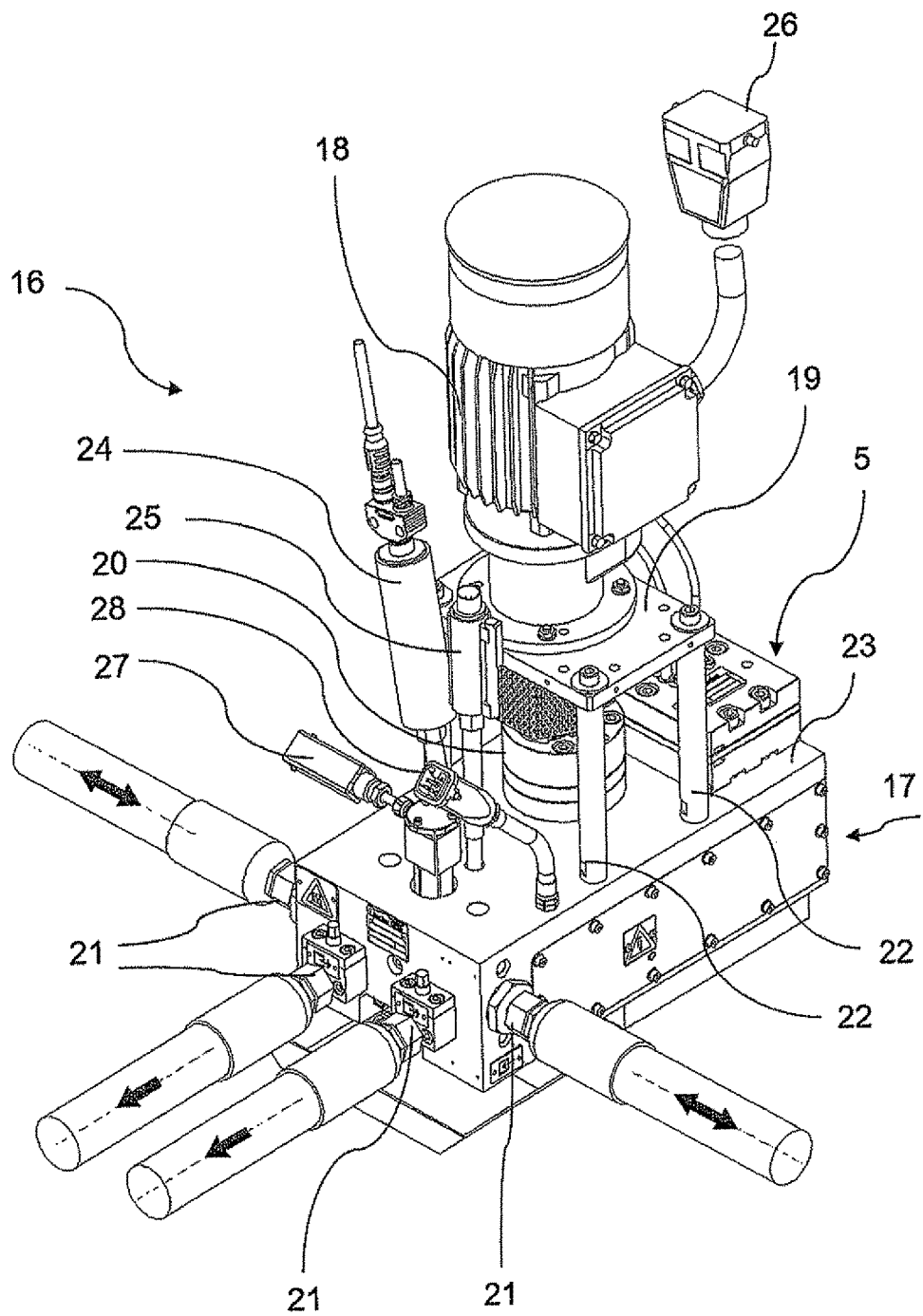
FIG. 5 shows a perspective view of a remote metering apparatus.
Figure 6:
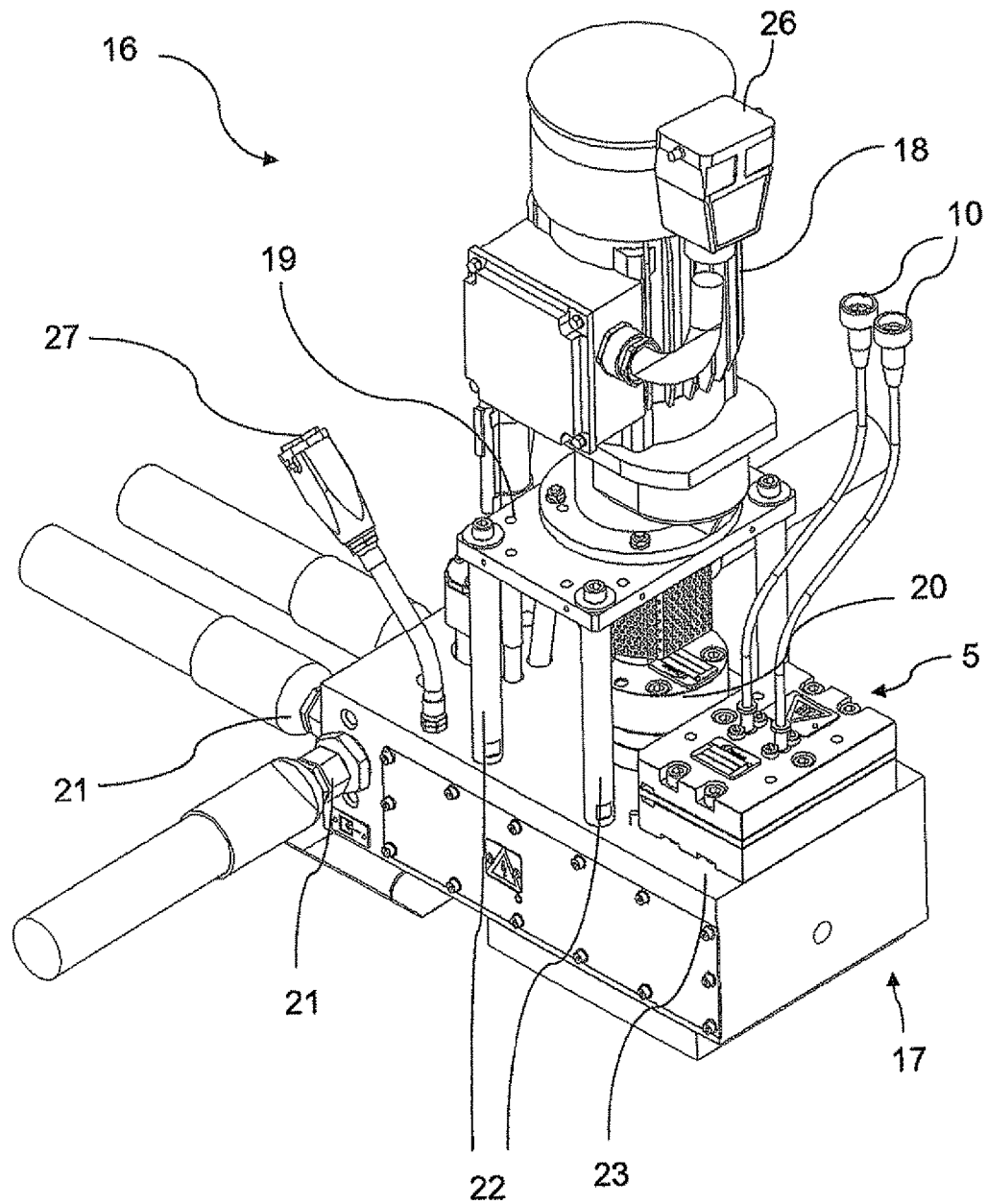
FIG. 6 shows a perspective view of the remote metering apparatus in FIG. 5.
Figure 7:
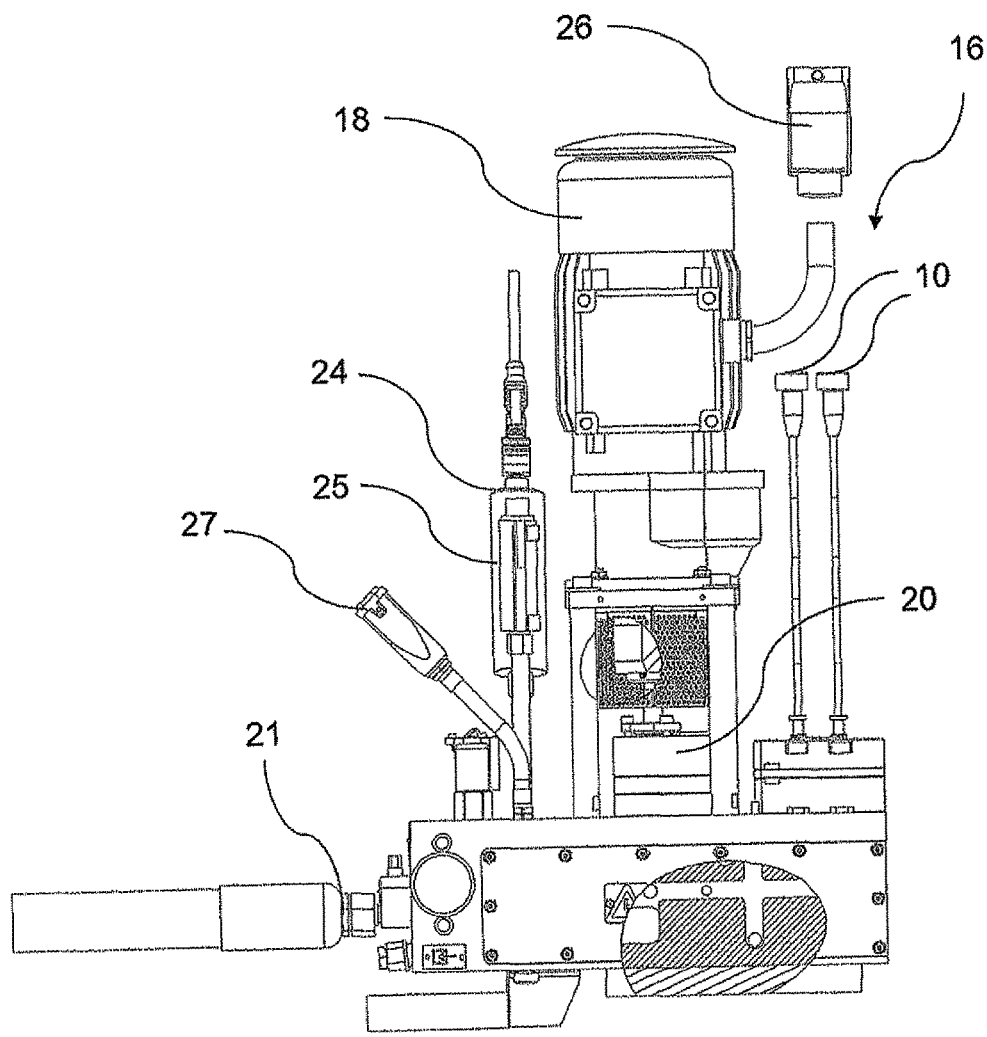
FIG. 7 shows a side view of the remote metering apparatus in FIG. 5.
Figure 8:
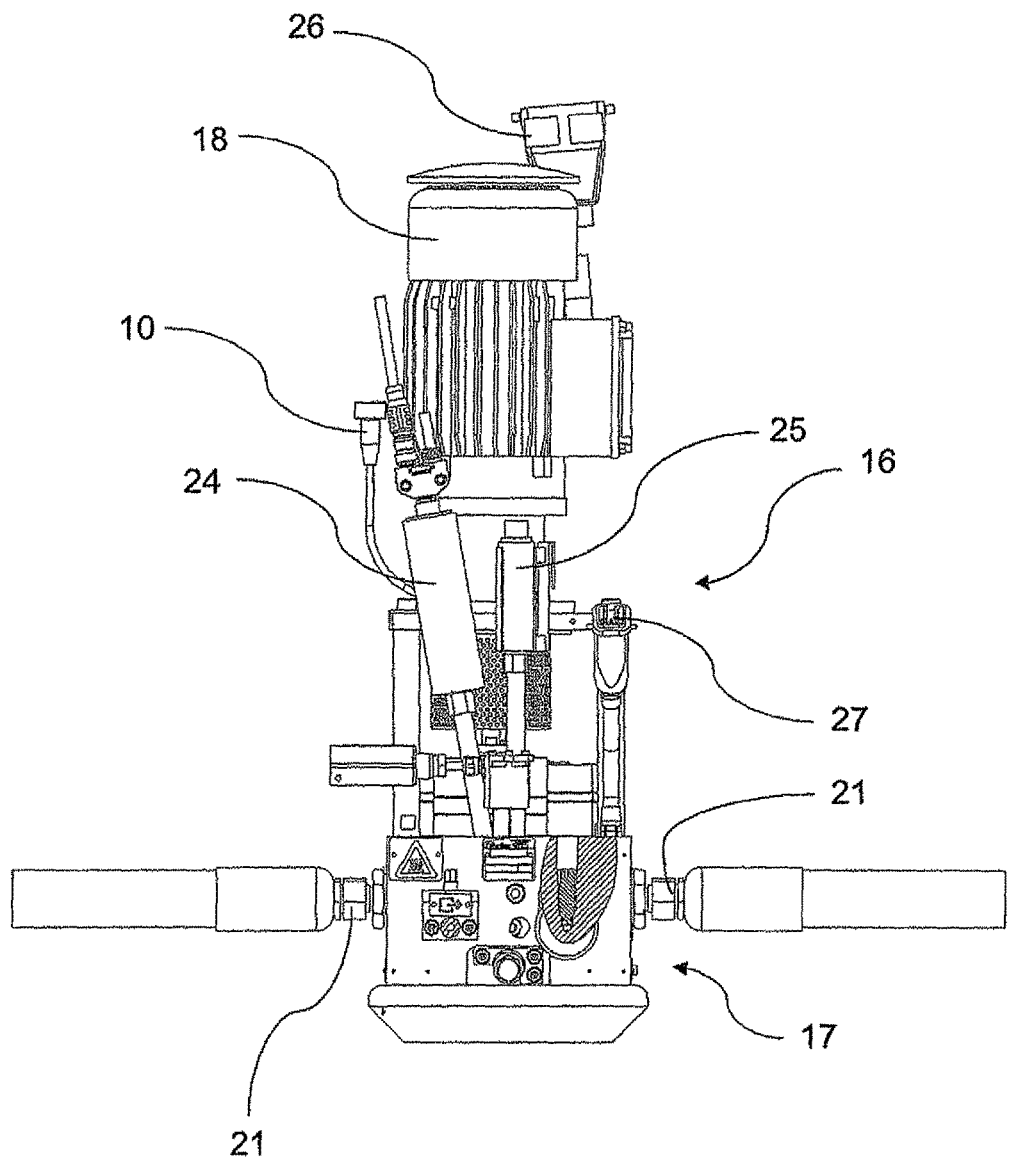
FIG. 8 shows a front view of the remote metering apparatus in FIG. 5.

FIGS. 1 to 4 show an apparatus 1 for dispensing fluids onto a substrate, in particular onto a substrate which is movable relative to the apparatus. Various fluids such as adhesive, in particular hot melt adhesive, can be dispensed by dispensing apparatus 1 and applied to various substrates such as books, book spines, films or the like. Such dispensing apparatuses are used for coating the surfaces of various kinds of substrate.

Dispensing apparatus 1 has a base body 2 and a nozzle arrangement 3 for dispensing fluid onto a substrate, said nozzle arrangement being a slit nozzle arrangement in the embodiment shown. Base body 2 is interspersed with fluid channels through which fluid flows. Nozzle arrangement 3 and base body 2 may be modular in construction and may be comprised of a plurality of adjacent segments. A valve assembly 4 which is used to regulate the flow of fluid in dispensing apparatus 1 is associated with nozzle arrangement 3. A first and a second support 6, 7 arranged opposite one another are provided on the side areas of a frame or similar structure for attaching dispensing apparatus 1 thereto.

Valve assembly 4 comprises a control member for moving a valve body relative to a valve seat by pneumatic or electrical means in a manner known from the prior art, in order to selectively interrupt or release the flow of fluid such that fluid can be selectively introduced into the nozzle arrangement 3 and dispensed therefrom. In the embodiment shown, the control member of valve assembly 4 is driven pneumatically. This can be done by introducing compressed air via an air inlet port 9, wherein the compressed air acts on a piston to move the valve body relative to the valve seat. Nozzle arrangement 3 has a dispensing slot 13 which is directly incorporated in nozzle arrangement 3. As an alternative, a dispensing slot may be disposed underneath nozzle arrangement 3.

In the region of dispensing slot 13, nozzle arrangement 3 has an edge 14. Opposite edge 14, a clamping unit 15 adapted to receive and fix the nozzle is provided. As can also be seen from the views presented in FIGS. 1 to 4, a metering device 5 according to the invention, which shall be described in more detail below with reference to FIGS. 9 to 13, is located on the top side of base body 2. Metering device 5 is in fluid communication with dispensing apparatus 1, at least by means of a fluid inlet and a fluid outlet via a corresponding fluid inlet and fluid outlet on base body 2. For the general supply of electricity to dispensing apparatus 1, electrical connections 8 are provided, via which electrical signals, such as switching signals and measurement signals, as well as electrical energy can be transmitted. The electrical connections are also used to supply electrical energy for heating dispensing apparatus 1.

The fluid, in particular hot melt adhesive, is supplied via a supply connection 11, which comprises a supply connector 12. Supply connection 11 and supply connector 12 are disposed on the side of dispensing apparatus 1 facing away from dispensing slot 13.

FIGS. 5 to 8 show a remote metering apparatus 16 which can be connected by an inlet hose to an apparatus supplying a fluid, in particular hot melt adhesive, and by an outlet hose to dispensing apparatus 1. Remote metering apparatus 16 comprises a base body 17 to which the inlet and outlet hoses can be connected via supply connections 21. Electrical connections 27 used for supplying electrical energy, inter ally for heating the base body 17 through which the supplied fluid flows, are disposed on base body 17. The inlet and outlet hoses can be attached to base body 17 via supply connections 21. In order to monitor the flow of fluid supplied to remote metering apparatus 16, pressure sensors 24, 25 are provided which monitor the pressure of fluid entering base body 17 via the inlet hose, and the pressures of the fluid exiting base body 17 via the outlet hose. Remote metering apparatus 16 is responsible for compensating any differences in pressure of volumetric flow during transfer of a fluid provided in the form of a hot melt adhesive from a melting apparatus to a dispensing apparatus in order to ensure uniform dispensing of fluid by dispensing apparatus 1, even when fluid is supplied and transported over a greater distance.

A pump 20 connected to a motor 18 via a drive shaft and a coupling is located on the top side of base body 17. Motor 18 is disposed on a support 19, which is spaced apart from base body 17 by rods 22. Motor 18 is connected to a voltage source via plug connection 26.

Figure 9:
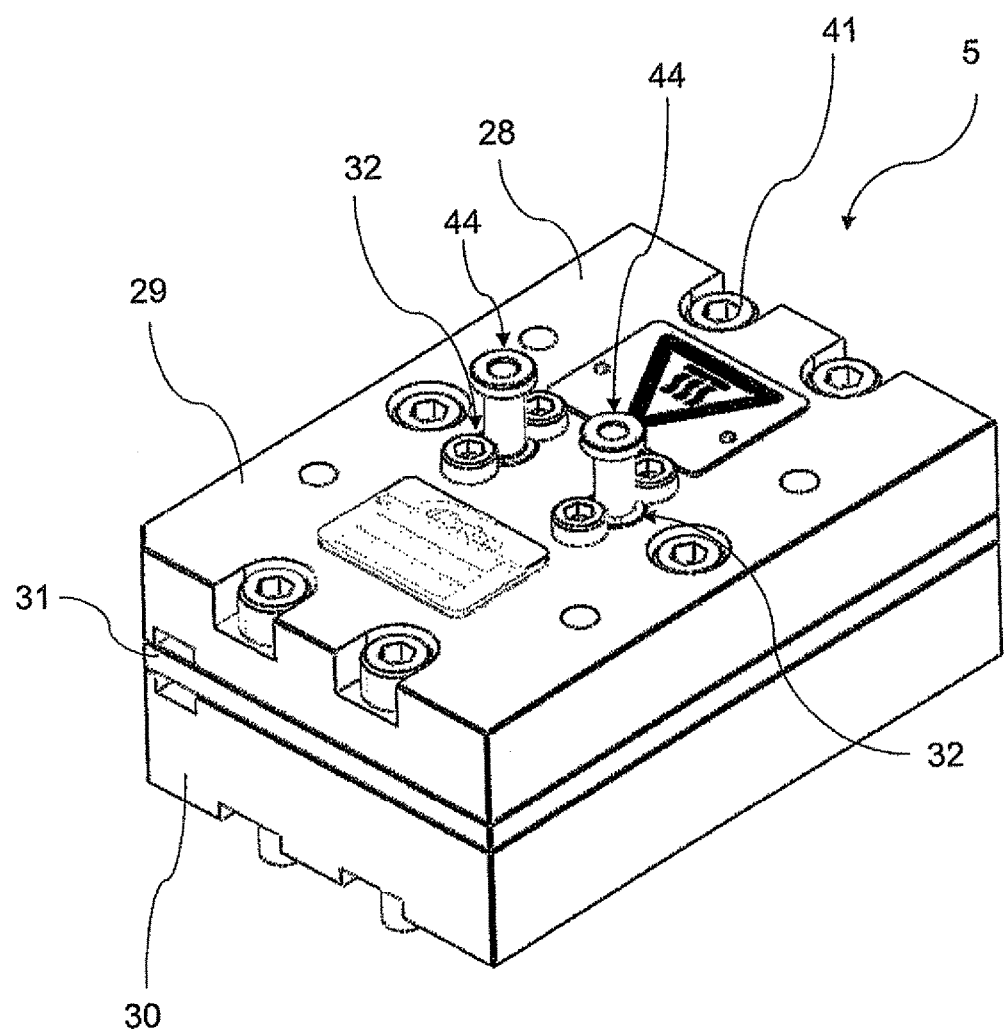
FIG. 9 shows a perspective view of a metering device.

FIG. 9 shows, in a perspective view, a metering device 5 according to the invention which can be mounted on a dispensing apparatus 1 or a remote metering apparatus 16. Metering device 5 comprises a multipart housing 28 comprising an upper housing portion 29, a lower housing portion 30 and a gear chamber 31 inserted between the upper housing portion 29 and the lower housing portion 30. One or more connections 32 are provided on the top side of upper housing portion 29 for receiving and connecting a probe 44 that includes a fiber optic 10 (cf. FIG. 14).

Figure 10:
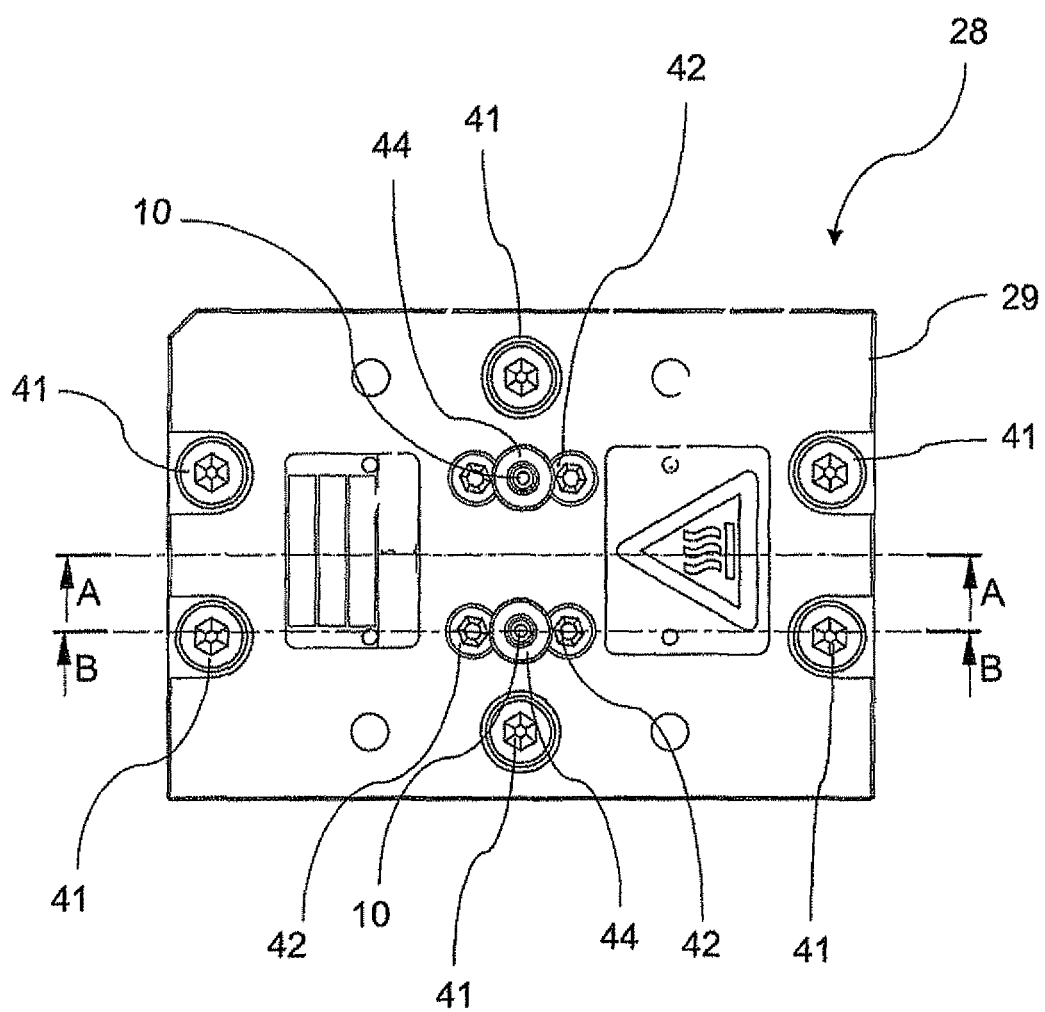
FIG. 10 shows a plan view of the metering device in FIG. 9.

FIG. 10 shows a plan view of the metering device 5 shown in FIG. 9. Upper housing portion 29, lower housing portion 30 and gear chamber 31 are connected to each other by screw connections 41. Connections 32 for probe 44 and fiber optic 10 on the top side of upper housing portion 29 are fixed by means of screws 42.

Figure 11:
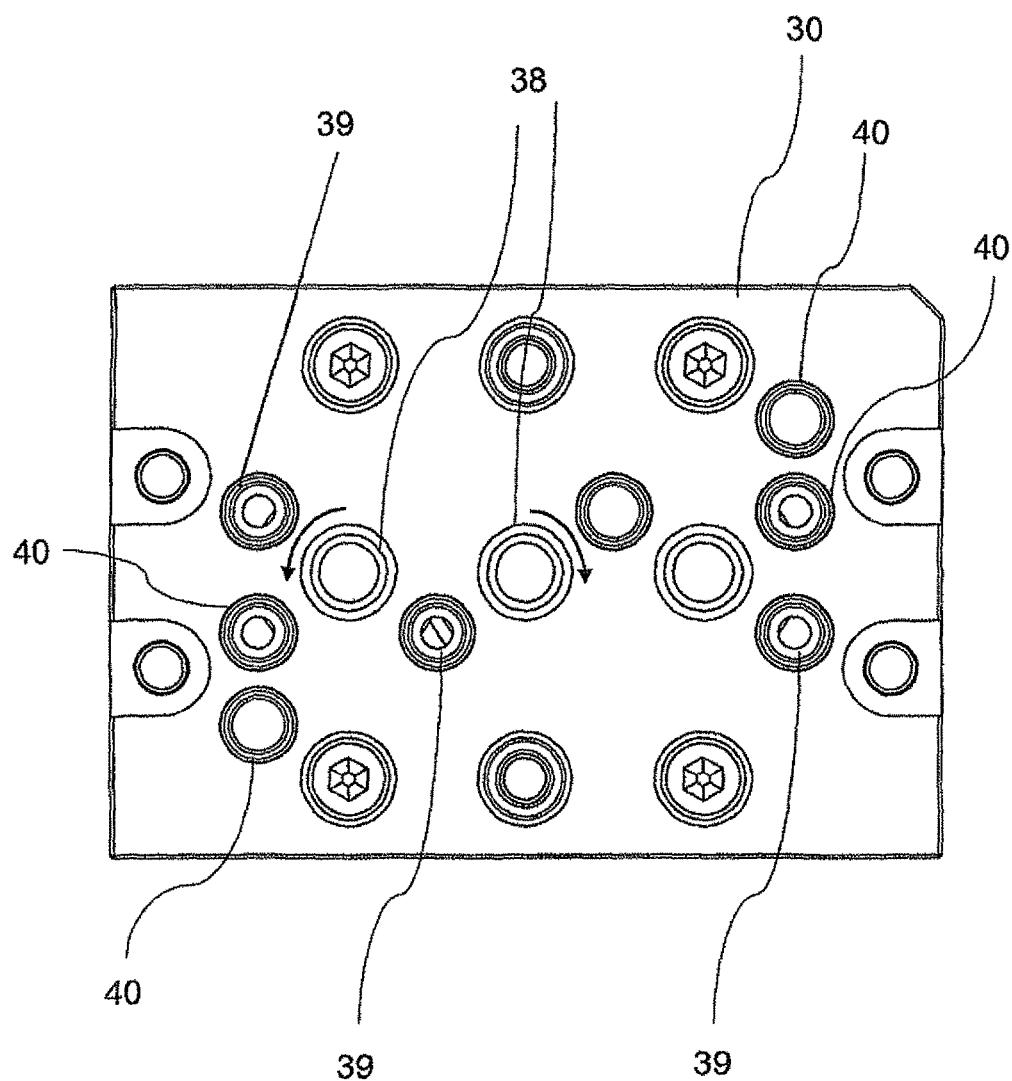
FIG. 11 shows a view from below of the metering device in FIG. 9.

FIG. 11 shows a view from below of lower housing portion 30, which has a plurality of fluid inlets 39 and fluid outlets 40. Fluid passing through metering device 5, via the fluid channels located in housing portions 29, 30, is supplied from dispensing apparatus 1 and supplied to remote metering apparatus 16, respectively, via said fluid inlets 39 and fluid outlets 40. Rotating axles 38, adjacent to which fluid inlets 39 and fluid outlets 40 are disposed, extend through parts of housing 28.

Figure 12:
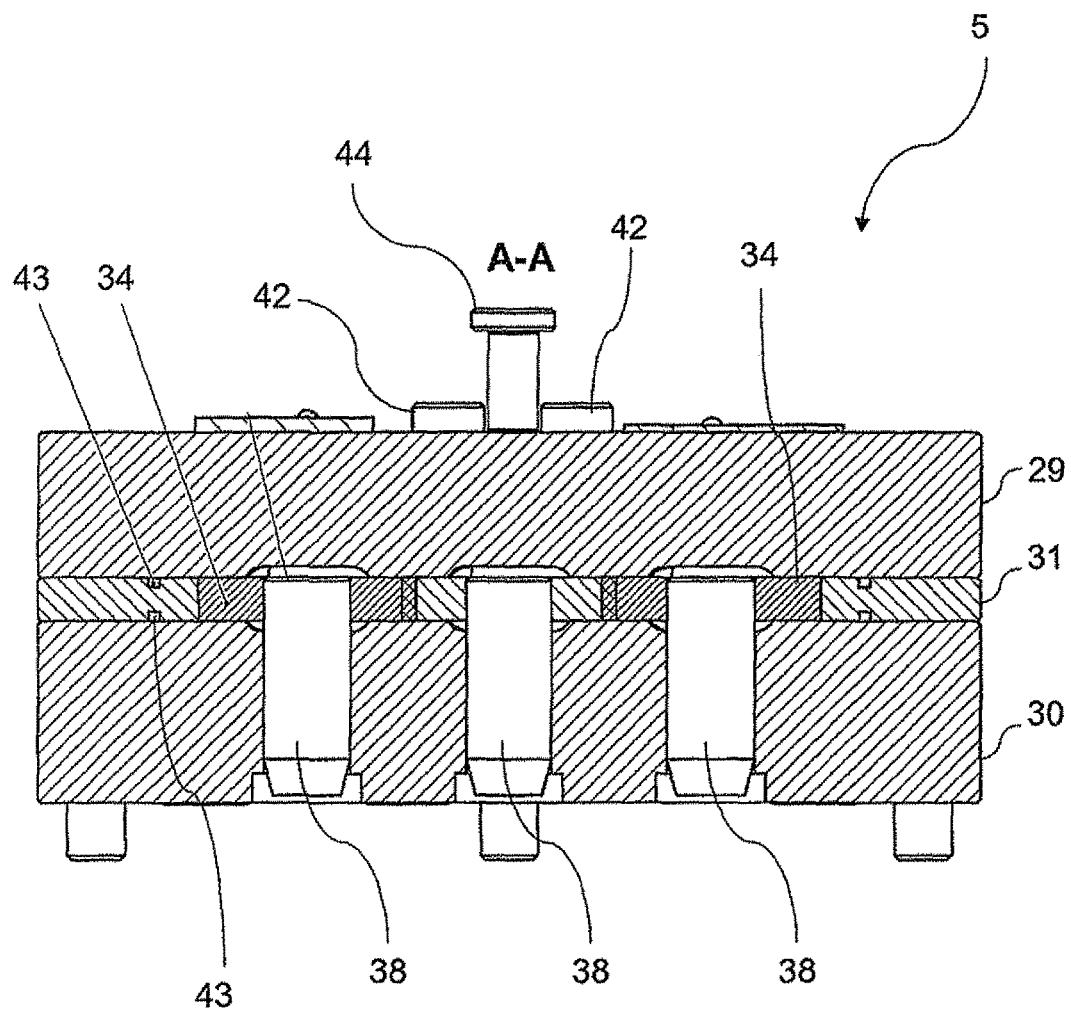
FIG. 12 shows a longitudinal cross-sectional view along line A-A in FIG. 10.

FIG. 12 shows a longitudinal cross-section through the housing 28 of metering device 5, from which the interior structure of housing 28 in this region can be seen. Gear chamber 31 is sealed against upper housing portion 29 and lower housing portion 30 by sealing elements 43 to prevent fluid from exiting housing 28. Rotating axles 38 each carry a gear 34 driven by the fluid entering through the fluid inlets 39 located adjacent to gears 34. Gears 34 transport the fluid in the direction of rotation to fluid outlets 40, from whence the fluid is supplied or returned to dispensing apparatus 1 and remote metering apparatus 16, respectively, via corresponding fluid inlets on base body 2 of dispensing apparatus 1 and on base body 17 of remote metering device 16, respectively. The fluid is transported through cavities formed between engaging gears 34 and the wall of the gear chamber 31 surrounding gears 34. The Figure shows the positioning of probe 44. In this embodiment, probe 44 is located substantially parallel to the rotating axles and offset from sectional plane A-A.

Figure 13:
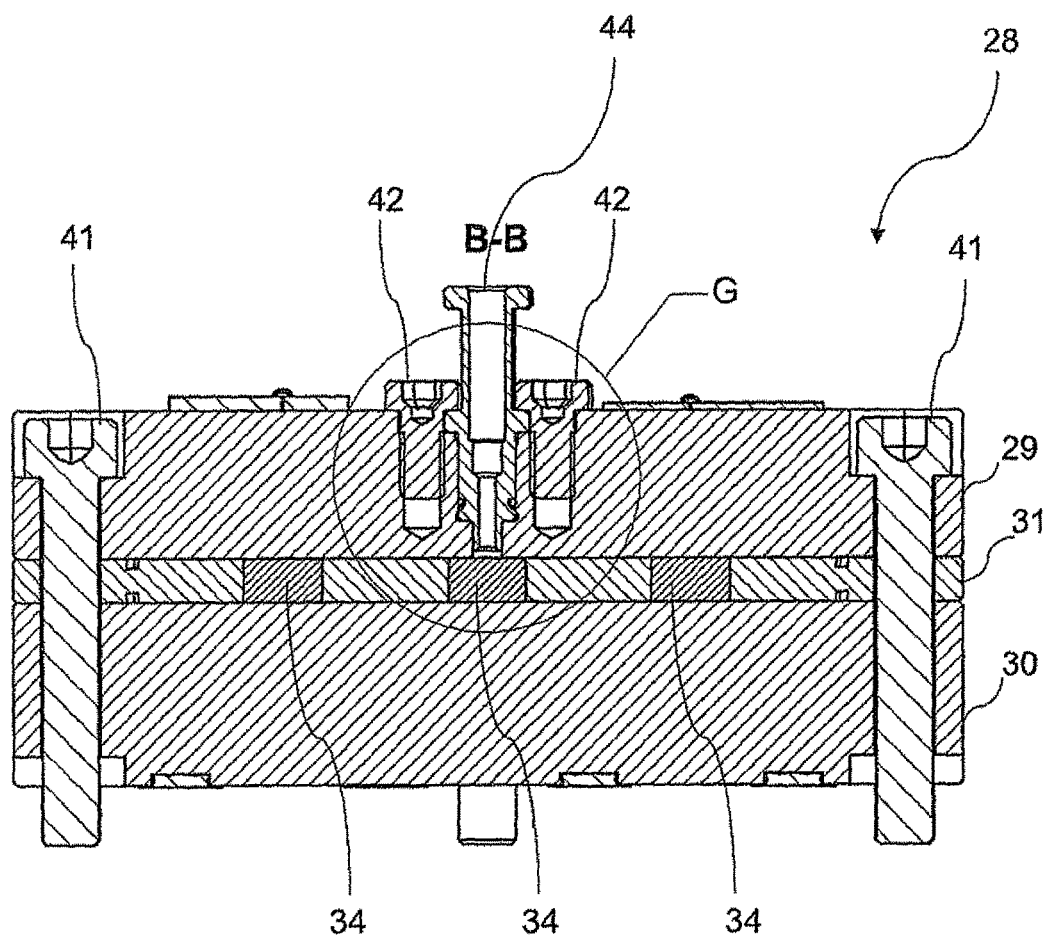
FIG. 13 shows a longitudinal cross-section along line B-B in FIG. 10.

FIG. 13 shows a longitudinal cross-section along line B-B in FIG. 10, through the housing 28 of metering device 5. At least one probe 44 is inserted as part of a measuring unit into upper housing portion 29, said measuring unit being adapted for contactless optical detection of the rotational speed of one of gears 34.

Figure 14:
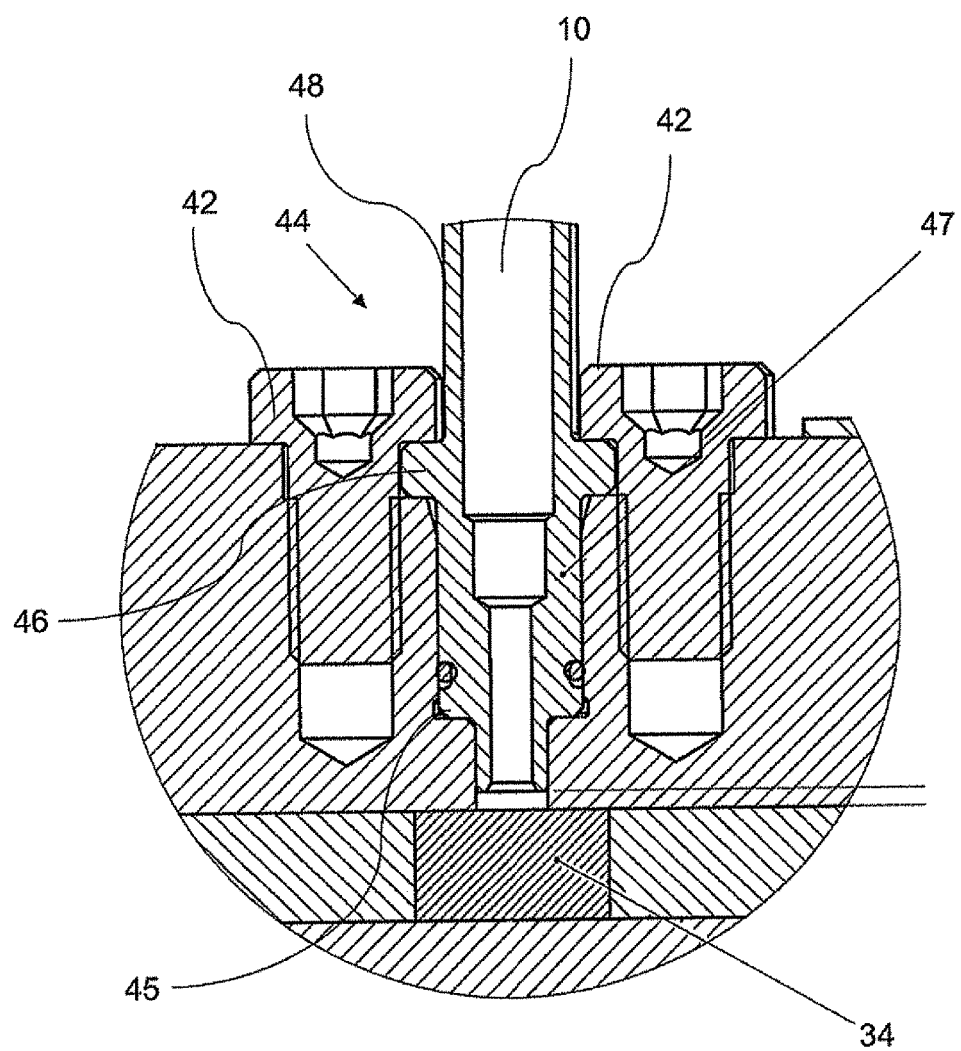
FIG. 14 shows an enlarged view of a part of the metering device in FIG. 13.

The arrangement and the structure of probe 44 is illustrated in FIG. 14, which is an enlargement of detail G in FIG. 13. Probe 44 can be inserted light-sealingly and fluid-sealingly into a correspondingly shaped recess 47 in housing 28 of metering device 5. In order to fasten probe 44, said probe 44 comprises a shape 48 having a circumferential flange 46 that is partially overlapped by the screw heads of screws 42. Probe 44 is connected via fiber optic 10 to a light source which designed to produce light, the light source being part of the measuring unit. Probe 44 of the measuring unit is adapted to emit light onto a portion of gear 34, from which the light is reflected. The position of probe 44 is spaced apart from rotating axle 38 of gear 34, chosen such that the portion onto which the probe 44 emits light is between the tip diameter and the root diameter of gear 34.

Probe 44 is adapted to receive light reflected off the portion of the gear 34 onto which the probe 44 emits light. In order to analyze the light received from probe 44, the measuring unit includes a signal transducer which is adapted to detect light received by probe 44 and returned via fiber optic 10 to the signal transducer, in order to produce electrical signals corresponding to the intensity of the reflected light that are representative of the rotational speed of gear 34.

The invention claimed is:

1. An apparatus for dispensing a fluid, the apparatus comprising:
   a base body comprising a fluid inlet, a fluid outlet and one or more fluid channels connecting said fluid inlet to said fluid outlet;
   a nozzle for dispensing said fluid, said nozzle being coupled to said base body and in fluid communication with said fluid outlet;
   one or more electrically or pneumatically actuated valves for selecting, releasing or blocking fluid flow through said one or more fluid channels and/or through said nozzle; and
   a metering device including:
      a housing comprising a first side housing portion and a second side housing portion, a fluid inlet through the first side housing portion, and one or more fluid outlets through the first side housing portion;
      a gear rotatably supported by an axle and in a gear chamber between the first side housing portion and the second side housing portion, the gear comprising a plurality of teeth forming a tip diameter and a root diameter, such that a cavity for fluid transport is formed between two adjacent teeth of the plurality of teeth and said housing;
      one or more chamber inlets in fluid communication with said fluid inlet and said gear chamber such that fluid may enter the gear chamber;
      one or more chamber outlets in fluid communication with said one or more fluid outlets and said gear chamber such that fluid is transported inside said cavities between said gear and a wall of said gear chamber towards the one or more chamber outlets and may flow towards the one or more fluid outlets; and
      a measuring unit for contactless optical detection of a rotational speed of the gear, wherein:
         the measuring unit comprises one or more probes which are received light-sealingly and fluid-sealingly within a recess formed through the second side housing portion into the gear chamber and which are configured to emit light onto or receive light from a portion of the gear, said recess being spaced from the axle of the gear,
         the portion of the gear is located in between the tip diameter and the root diameter of said gear, and
         the measuring unit comprises a light source for producing light and one or more fiber optics for guiding said light from the light source towards said one or more probes,
         wherein the first side housing portion of the metering device is mounted onto the base body, the fluid inlet of the metering device is in fluid communication with a heating device, and the one or more fluid outlets of the metering device are in fluid communication with said fluid inlet of said base body.

2. The metering device of claim 1, wherein the one or more probes are configured to receive light emitted by the light source.

3. The metering device of claim 2, wherein the one or more probes are configured to receive light reflected off said portion of the gear onto which the one or more probes emit light.

4. The metering device of claim 2, wherein the light source is located on a side of the gear opposite the one or more probes, said light source being configured to emit light towards the one or more probes such that the teeth of the gear at least partially block an optical path between said light source and said one or more probes.

5. The metering device of claim 1, wherein the measuring unit comprises a signal transducer which is configured to detect light received by said one or more probes and to produce electrical signals corresponding to the intensity of the received light.

6. The metering device of claim 5, wherein said signal transducer and said light source are located outside said housing.

7. The metering device of claim 1, wherein said gear is a first gear and said metering device comprises one or more further gears which are respectively supported rotatably in said housing and inserted into said gear chamber in said housing such that a cavity for fluid transport is formed in between two adjacent teeth and said housing, said teeth engaging each other such that a cavity for fluid transport is formed in between said engaging teeth.

8. The metering device of claim 6, wherein said one or more chamber inlets are located such that fluid passes between two adjacent gears in a direction of rotation of said adjacent gears.

9. The metering device of claim 1, further comprising at least one fastener, wherein the probe comprises a circumferential flange that is partially overlapped by the at least one fastener to secure the probe to the housing.

10. The metering device of claim 1, wherein the one or more probes comprise a first probe configured to emit light onto or receive light from a first portion of the gear, and a second probe configured to emit light onto or receive light from a second portion of the gear.

11. The metering device of claim 9, wherein the circumferential flange is received in the recess.

* * * * *